United States Patent [19]

Reid-Green

[11] Patent Number: 4,971,309
[45] Date of Patent: Nov. 20, 1990

[54] AUTOMATIC DOCUMENT FEED MECHANISM

[75] Inventor: Keith S. Reid-Green, Pennington, N.J.

[73] Assignee: Educational Testing Service, Princeton, N.J.

[21] Appl. No.: 434,515

[22] Filed: Nov. 14, 1989

Related U.S. Application Data

[63] Continuation of Ser. No. 278,784, Dec. 2, 1988, abandoned.

[51] Int. Cl.[5] .......................... B65H 3/06; B65H 9/00
[52] U.S. Cl. ..................................... 271/10; 271/111; 271/227; 271/251
[58] Field of Search ............... 271/110, 111, 227, 251, 271/10

[56] References Cited

U.S. PATENT DOCUMENTS

| | | | |
|---|---|---|---|
| 3,603,585 | 9/1971 | Maloney | 271/227 X |
| 4,621,801 | 11/1986 | Sanchez | 271/251 |
| 4,657,239 | 4/1987 | Ikesue | 271/227 |

OTHER PUBLICATIONS

IBM Technical Disclosure Bulletin, vol. 18, No. 5, pp. 1307-1308, Oct. 1975, "Sheet Aligner", S. R. Harding and J. C. Rogers.

Primary Examiner—Richard A. Schacher
Attorney, Agent, or Firm—Woodcock Washburn Kurtz Mackiewicz & Norris

[57] ABSTRACT

Combination automatic feed systems and sheet readers are provided by this invention which include aligning and picking mechanisms for transporting and laterally aligning a sheet of paper relative to a flow path. The system includes a microprocessor for delivering a sheet to the alignment mechanism whereby a timing of this delivery by the automatic feeding mechanism is coordinated with the timing of the reading of the sheets in the sheet reader to compensate for both regular and irregular delays in reading the sheets, for example, during the grading of test scores. Methods for automatically feeding, reading and aligning sheets for a sheet reader are also provided.

10 Claims, 1 Drawing Sheet

AUTOMATIC DOCUMENT FEED MECHANISM

This is a continuation of application Ser. No. 278,784, filed Dec. 2, 1988 now abandoned.

BACKGROUND OF THE INVENTION

This invention relates to systems for automatic feeding of documents and, in particular, automatic feeders designed to operate with scanners for optically scanning printed forms and the like.

Scanning devices for scanning printed sheets and forms have taken on increased importance in many areas. For example, in the area of forms used for obtaining test information, or information of any sort which is recorded manually by a person who is filling out a form, it is very important to be able to automatically process the form to as great as extent as possible to derive the information therefrom. Thus, as used by the assignee of this invention, a Terminal Data Corporation 4140 paper transport scanner is utilized for scanning documents and forms, e.g. up to 11×17 inches. The scanner has a mechanism for transporting the document from the scanner bed, where it may be manually positioned, into the optical scanning area, performing the optical scanning and generation of corresponding digital data, and then ejecting the document out the other end. In this commercially available device, the transport mechanism positions the document somewhat crudely in the scan area, the exact position being very much a function of where the document is manually positioned on the scanner bed prior to its being transported into the scanner.

As can be appreciated, in applications where a great volume of documents is to be scanned, it is highly important, and indeed imperative, to provide automatic feeding into the scanner. Not only is automatic feeding required in order to increase through-put, but for reliable high-speed operation there must be provided an automatic feeder mechanism for automatically aligning the forms, or sheets, as they are fed to the scanner bed. What is desired, and has heretofore been unavailable, is an automatic feeding mechanism that not only is capable of operating at high speed, but which positions the documents to be scanned with a high degree of accuracy, so that when they are taken over by the scanner, they are in turn positioned for accurate optical imaging and scanning. Further, in order to achieve a high rate of through-put, it is required that the feed mechanism be controlled so as to provide the next sheet, or form, the very instant when the scanner is ready to be primed with a next form, and to avoid feeding a following sheet before the scanner is in position to accept it.

SUMMARY OF THE INVENTION

It is an object of this invention to provide a reliable automatic document feeder for feeding documents to a scanning device, the automatic feeder being part of a high-speed system for processing documents that have been filled in, and for obtaining therefrom the desired data.

It is another object of this invention to provide an automatic document feeder, and method of feeding documents to an optical scanner, whereby the position of the document when it is transported to the scanner is controlled.

It is another object of this invention to provide an automatic feeder which is designed to interface with an optical scanner, so that each document as it is delivered to the scanner is positioned so that when it is transported into the scanner it is optimally positioned for reliable image processing.

It is another object of this invention to provide an automatic feeder capable of interfacing with an optical scanner, wherein the feeder is controlled so as to provide reliable high-speed feeding of documents one at a time to the optical scanner, while avoiding any overlap of documents as they are fed to the scanner.

In view of the above objects, there is provided an automatic feeding device, including a hopper for accepting a batch of documents, or forms, which forms are to be read by an optical scanner. The feeding device is controlled to pick the documents, or sheets, one at a time, align them relative to the transport path of the optical scanner, and control the feeding of the aligned sheets through to the optical scanner. In the device of this invention, a plurality of alignment rollers are provided which are canted at an angle adjusted to move each sheet toward a form guide, whereby the sheet is optimally positioned at the time it is turned over to the scanner transport mechanism. Further, controls are provided for insuring that only one sheet at a time is provided to the scanner, and that sheets are delivered into position as quickly as possible each time that the scanner has finished with the scanning of a sheet.

DESCRIPTION OF THE PREFERRED EMBODIMENT

In the practice of this invention, it is desired to provide an automatic feeder for providing paper sheets, e.g., forms on which information has been filled in by hand, to a document scanner such as the Terminal Data Corp. 4140 scanner. A typical such form utilized by the assignee of this invention is the Financial Aid Form, which constitutes one sheet of about 11×17 inches, a copy of which is appended as Appendix I. The single sheet constitutes two 8½ by 11 inch form pages on each side, and can be scanned on both sides by the 4140 scanner during one pass therethrough.

The Financial Aid Form (FAF) is registered within the scanner by looking for registration marks printed on the form, the registration marks suitably being black squares upon a white background, the squares being positioned at about the four corners of each 8½ by 11 page of the form. In order to achieve quick through-put and reliability of scanning, it is necessary that the scanner mechanically position the form so that it is approximately where the video system expects it to be, i.e. so that the four registration marks are found in approximately the locations where they are anticipated. In order to achieve this, the form cannot be inputted in a random manner, but must be presented to the scanner aligned so that the scanner in turn transports it to a desired position within predetermined tolerances. The TDC 4140 scanner has a bed presenting a flat surface having tiny holes therethrough, the holes being connected to a vacuum supply which captures the sheet. When so captured on the bed, or platform, and the scanner gives the proper signal, the paper is transported by drive belts rollers which engage the bottom of the sheet and carry it into the scanner and into position for scanning. The automatic feeder of this invention interfaces with the scanner bed, or platform, so as to deliver, at times when the vacuum is not applied, at a controlled rate and sequence, forms to the scanner platform where they are sequentially captured and scanned.

Figure 1:
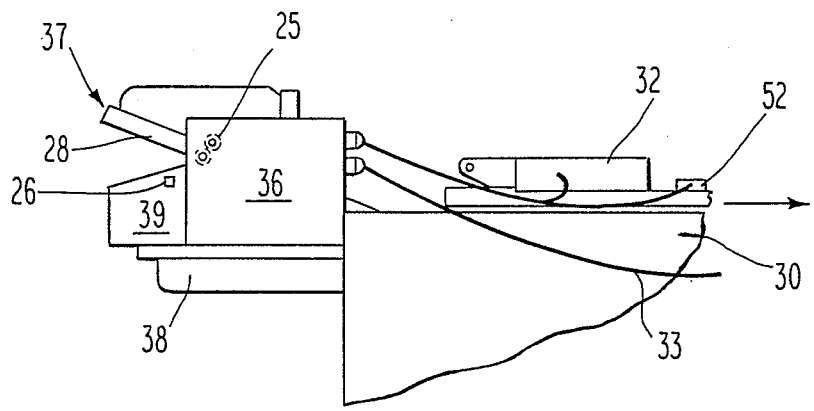
FIG. 1 is a diagrammatic side view of the feed mechanism of this invention positioned in conjunction with the receiving transport bed of an optical scanner.

Referring to FIG. 1, there is shown a diagrammatic side view of the automatic feeder of this invention interfacing with the feed bed 30, or platform of the scanner. In the preferred embodiment, the scanner bed has a vacuum system which captures the sheet that has been delivered to it. The vacuum provides reliable control and holding of the sheet as it is being transported to the scanning position. However, the scanner transport is designed to move the sheet only directly along the longitudinal flow path of the scanner. Thus, the sheet must first be accurately positioned laterally with respect to the flow path, and must be adjusted to eliminate skew, in order that the sheet be properly positioned upon transport to the scanning position.

Figure 2:
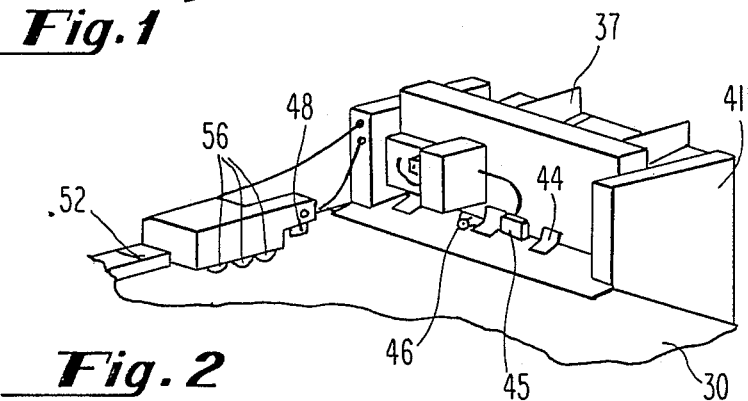
FIG. 2 is a perspective view showing a portion of the feed mechanism of this invention interfacing with the bed of an optical scanner, showing details of the feed mechanism components which align the sheet and control the feed-through of sheets to the scanner bed.
Figure 3:
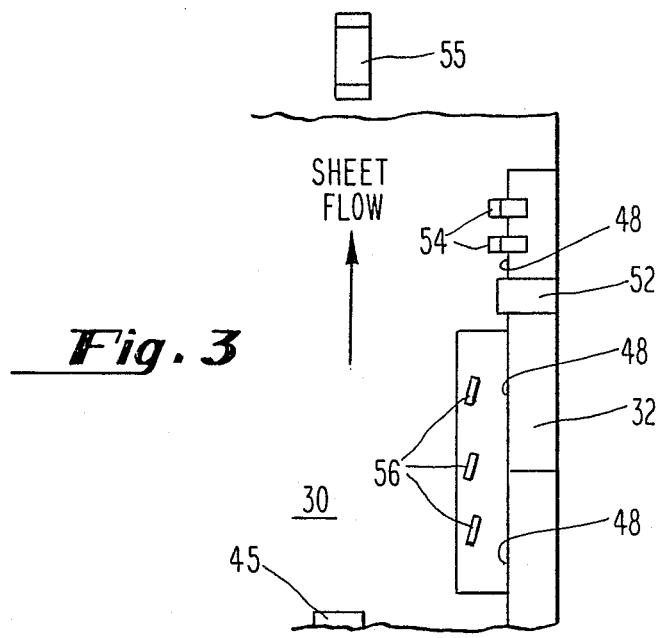
FIG. 3 is a diagrammatic sketch looking down on the sheet alignment mechanism which forms a part of the automatic feeder of this invention.

A sheet alignment mechanism is shown generally at 32, positioned on one side of the bed 30, namely to the right side when viewing from the feeder toward the scanner. The purpose of the sheet alignment mechanism is discussed in more detail in connection with FIGS. 2 and 3, is to align the sheets accurately in a lateral direction. It is important that the sheet be positioned properly in a lateral sense, and that it not be skewed with respect to the longitudinal flow path of the sheet as it is transported into the scanner. An end-of-file (EOF) cable 33 is indicated which connects through to the computer control of the scanner for telling the scanner that the software should do end-of-file group processing. The mechanical feed portion of the feed mechanism is shown comprising a central portion indicated at 36, a feed hopper 37, and the auto feeder console 39, all supported by auto feeder support table 38. Portion 36 contains pick wheels 25 and an associated motor mechanism, for picking the bottom sheet in the hopper and propelling it through to the bed of the scanner, in a known manner. The auto feeder console provides buttons for controlling the auto feeder, including an EOF button 26. Associated with console portion 39 is a microprocessor, not shown, which processes input signals from the console and from feeder sensors and controls operation of the feeder accordingly.

Because the feed hopper is limited in size, it may be the case that only part of a batch, or group of documents to be processed, can be placed into the feeder at a time. When the hopper empties setting of the empty hopper switch 28, the end of the batch may or may not have been reached. The EOF switch 26, present on the auto feeder console, permits the operator to provide an electronic indication of when the end of the batch, or file has been reached. If the hopper is empty and the EOF switch is not set, the system waits until more documents have been fed through, before proceeding with the group processing of the scanned documents. If the hopper empties while the EOF switch is set, a signal is sent along EOF cable 33 to the 4140 scanner, which the processor recognizes to indicate end of batch.

Referring to FIG. 2, there is shown a perspective view looking at the auto feeder from the side which connects to and interfaces with the scanner bed 30. Sidewalls 41 of the auto feed mechanism are indicated as defining the sides of the mechanism. The hopper 37 is shown, where the group of sheets are laid for picking and passing through to the bed 30. When a sheet is picked by the pick rollers of the auto feeder, it is passed through under guide 44, where its presence is sensed by rear sensor 45. A multiple sheet detector 46 is also mounted adjacent rear sensor 45, which can be adjusted to allow a wide range of paper thicknesses. The multiple sheet detector 46 acts to stop the feeder in the event that more than one sheet has been picked. To the right side of the scanner bed 30, as looking from the auto feeder toward the scanner, the sheet alignment mechanism 32 is placed for receiving a sheet, passing it forward toward the scanner, and aligning it laterally as discussed above. The sheet alignment mechanism is mounted on a form guide 48, also indicated in FIG. 3, which is aligned with the through axis of the scanner. The sheet is drawn under a guide bar of the alignment mechanism 32 and held against form guide 48 by a set of alignment rollers 56. Rollers 56 are canted 2° toward the form guide, and are driven while the paper is moving toward the forward sensor 52. Thus, a sheet that is being driven past the initial guides 44 is picked up by rollers 56 and transported forward and also aligned against form guide 48. Once the paper is detected to be under the forward sensor 52, power to the rollers 56 is removed, so that the sheet is in position to be picked up and taken over by the 4140 scanner.

Referring to FIG. 3, there is shown a diagrammatic representation of the elements which move a sheet and the sensors which control the sheet movement. When no sheet is detected at the rear sensor 45, the pick roller motor is turned on to drive for up to five seconds. As long as no sheet is sensed at the forward sensor, the sheet moves past the rear sensor and is brought under the alignment rollers 56, which power the sheet forward and also align it laterally, as discussed above. A pair of photosensors 54 are mounted within alignment mechanism 32, to detect when the sheet has been inserted so that its edge is against the form guide. When this is the case, the two photocells are both interrupted. Interruption of both photocells signals the scanner to start the vacuum and then the transporter belts, so that the sheet can be taken into the scanner. The two photocells are aligned with the form guide, such that if only one of the photocells detects the presence of the sheet edge, the scanner will not receive a signal. Thus, a sheet that is not properly aligned will cause the feeding processing to stop, until the sheet is removed or properly aligned. It is noted that any plurality of sensors may be utilized, to achieve the ability.

When the sheet reaches the forward sensor 52, power to the alignment rollers is disconnected, such that control is effectively turned over to the scanner. The presence of a sheet under the forward sensor also disables drive of the pick rollers, such that no sheet is advanced until the scanner transport has moved away the sheet that is under the forward sensor. This arrangement enables accurate controlling of the sheet flow, and accounts for the irregular time delay that may exist between scanner sheet feeds. Thus, the auto feeder system detects the presence of a sheet on the platform and does not feed another sheet until the platform is clear. Whenever the forward sensor is clear, indicating the absence of a sheet, the pick rollers operate for a long enough time to move a sheet forward to be picked up by the alignment rollers and brought into position under the forward sensor, at which time the auto feed mechanism turns the transport over to the scanner.

There has thus been described and illustrated an auto feed mechanism for feeding a sheet to and interfacing with a sheet reader such as an optical scanner. The auto feed mechanism controls delivery of sheets to the sheet reader, allowing for irregular delays at the sheet reader, and providing the next sheet automatically to the sheet reader as soon as it is clear and ready for the next sheet. The auto feeder also accurately aligns the sheet laterally so that when it is delivered over to the sheet reader it can be accurately and reliably positioned within the reader.

I claim:

1. In combination, an auto feed system and a sheet reader, said sheet reader having a transport mechanism for transporting the sheet within the reader in a substantially fixed lateral position, comprising:
   means for picking a sheet and transporting it forward toward the sheet reader along a flow path which is aligned with the flow path of the sheet reader transport mechanism;
   means for aligning said picked sheet laterally with respect to said flow path;
   means for detecting the lateral alignment of the sheet relative to said flow path and enabling feeding of the sheet to the reader transport mechanism only when the sheet is detected in an alignment position; and
   microprocessor means for enabling said picking means for delivering a sheet to said alignment means only when the reader transport mechanism has carried a sheet away form said alignment position, whereby the timing of delivery of sheets by said auto feed system is coordinated with the timing of reading of sheets in said sheet reader to compensate for both regular and irregular delays in reading said sheets.

2. The system as described in claim 1, wherein said alignment means comprises a set of rollers oriented at a small angle with respect to said flow path.

3. The system as described in claim 2, wherein said small angle is about 2°.

4. The system as described in claim 1, wherein said alignment means comprises a set of detectors for detecting when the edge of the sheet is properly aligned.

5. The system as described in claim 1, having a hopper for loading sheets therein and controllable pick means for picking a sheet from said hopper and advancing it forward toward said scanner along said flow path.

6. The system as described in claim 5, comprising a rear sensor for sensing when a sheet is not present at a position forward of said hopper, and for energizing said pick rollers to forward a sheet from said hopper when said rear sensor detects the absence of a sheet.

7. The system as described in claim 6, comprising a forward sensor positioned at a point where a sheet is in position to be picked up by the reader transport mechanism, said forward sensor being connected to said pick means to disable feeding of a document whenever a document is sensed to be present at said forward position.

8. The system as described in claim 1, having EOF means for providing a signal when the documents placed in said hopper comprise end-of-file; means for sensing when said hopper is empty; and means connected to said sheet reader for indicating when EOF is set and the hopper is empty, whereby group processing of the fed and read documents is enabled.

9. A method of automatically feeding aligned sheets to a sheet reader and reading said sheets, said sheet reader having means for capturing a sheet when it is positioned at a feed position and means for transporting said captured sheet along a predetermined flow path, said method comprising:
   sensing when a sheet is at said feed position,
   forwarding a sheet from a pile of sheets to said feed position only when no sheet is sensed at said feed position, said forwarding comprising aligning said sheet laterally with respect to said flow path, and correcting the skew of said sheet,
   detecting when said forwarded sheet is properly aligned at said feed position within a predetermined skew tolerance, and
   enabling said capturing only when said sheet is detected as properly aligned, said enabling comprising coordinating a timing of a delivery of said sheets with a timing of reading said sheets in said sheet reader to compensate for both regular and irregular delays in reading said sheets.

10. The method as described in claim 9, wherein said forwarding comprises driving said sheet against a guide position in parallel with said flow path.

* * * * *